(12) United States Patent
Hasegawa et al.

(10) Patent No.: US 6,850,311 B2
(45) Date of Patent: Feb. 1, 2005

(54) METHOD OF MANUFACTURING ELECTRO-OPTICAL DEVICE BY FLEXOGRAPHY FOR REDUCED MOIRE

(75) Inventors: Satoshi Hasegawa, Matsumoto (JP); Yoshifumi Kobayashi, Nagano-ken (JP)

(73) Assignee: Seiko Epson Corporation (JP)

( * ) Notice: Subject to any disclaimer, the term of this patent is extended or adjusted under 35 U.S.C. 154(b) by 37 days.

(21) Appl. No.: 09/965,685

(22) Filed: Sep. 27, 2001

(65) Prior Publication Data

US 2002/0126247 A1 Sep. 12, 2002

(30) Foreign Application Priority Data

Sep. 29, 2000 (JP) ........................................ 2000-300861

(51) Int. Cl.⁷ ..................... G02F 1/13; G02F 1/1335; B41N 6/00; B41B 1/14; B41F 31/00
(52) U.S. Cl. ..................... 349/187; 349/106; 101/401.1; 101/400; 101/352.13
(58) Field of Search .................. 349/187, 106; 101/401.1, 400, 352.13, 395; 430/7

(56) References Cited

U.S. PATENT DOCUMENTS

| | | | | |
|---|---|---|---|---|
| 4,152,986 A | * | 5/1979 | Dadowski et al. | 101/463.1 |
| 5,279,858 A | * | 1/1994 | Suzuki et al. | 427/256 |
| 5,514,503 A | * | 5/1996 | Evans et al. | 430/7 |
| 5,724,110 A | * | 3/1998 | Majima | 349/86 |
| 6,213,018 B1 | * | 4/2001 | Samworth | 101/395 |
| 6,396,470 B1 | * | 5/2002 | Zhang et al. | 345/87 |

FOREIGN PATENT DOCUMENTS

| | | | |
|---|---|---|---|
| EP | 1 189 097 A2 | * 9/2001 | ......... G02F/1/1335 |
| JP | 03-198029 | 8/1991 | |

OTHER PUBLICATIONS

Communication from Korean Patent Office regarding counterpart application.

* cited by examiner

Primary Examiner—Tarifur R. Chowdhury
Assistant Examiner—Jeanne Andrea Di Grazio
(74) Attorney, Agent, or Firm—Harness, Dickey & Pierce, P.L.C.

(57) ABSTRACT

When an alignment film 416 and an overcoating film 429 are formed by flexography on the front side of a second transparent substrate 420, on which color filters 407R, 407G, and 407B are formed at a predetermined same-color pitch P1, during the procedure for manufacturing a liquid crystal device 400, the pitch of meshes of an anilox roller used in flexography and the pitch of pitches formed on the surfaces of projections of a letterpress are set to be equal to the same-color pitch P1 of the color filters 407R, 407G, and 407B, thereby preventing moiré.

6 Claims, 6 Drawing Sheets

METHOD OF MANUFACTURING ELECTRO-OPTICAL DEVICE BY FLEXOGRAPHY FOR REDUCED MOIRE

BACKGROUND OF THE INVENTION

1. Field of the Invention

The present invention relates to a method for manufacturing an electro-optical device including a flexographic process. More particularly, the present invention relates to a flexographic technique in the manufacturing method.

2. Description of the Related Art

In electronic devices, such as mobile telephones, displays are formed of electro-optical devices. The most typical electro-optical device is a liquid crystal device that uses liquid crystal as the electro-optical substance.

Figure 2:
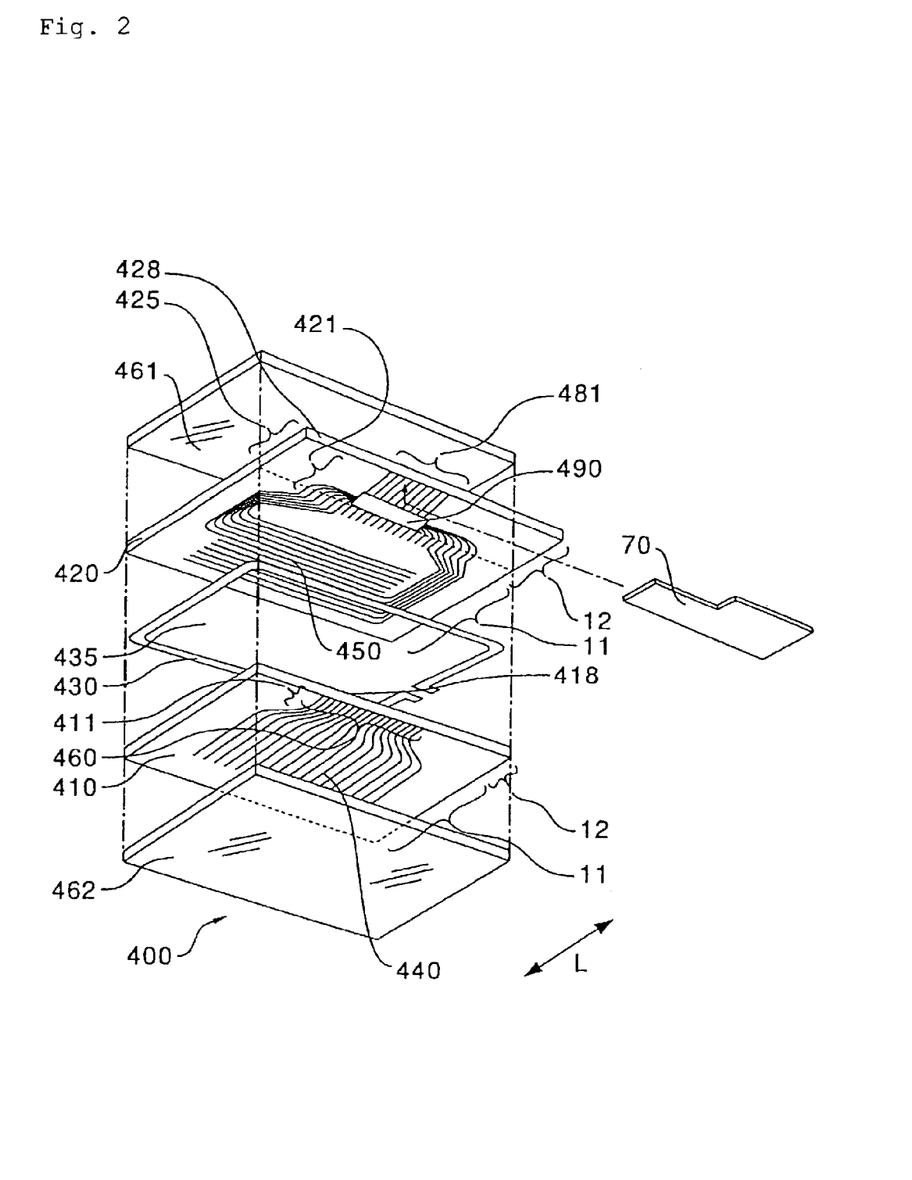
FIG. 2 is an exploded perspective bottom view of the liquid crystal device shown in FIG. 1.
Figure 3:
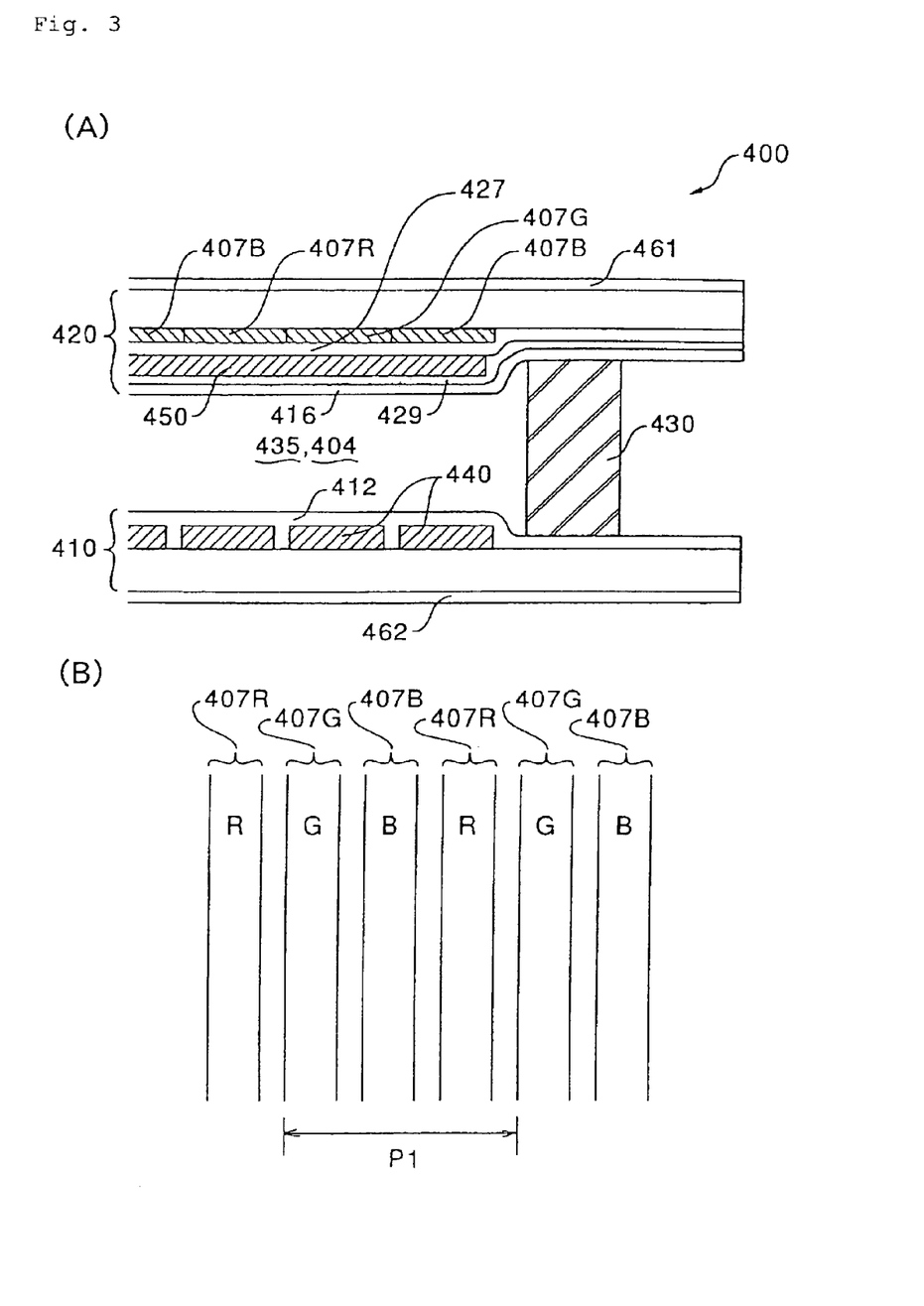
FIG. 3(A) is a sectional view of the liquid crystal device shown in FIGS. 1 and 2.
FIG. 3(B) is a plan view showing the planar arrangement of color filters formed in the liquid crystal device.

As shown in FIGS. 2 and 3(A), in a liquid crystal device 400, a liquid crystal 404 serving as an electro-optical substance is held between a first transparent substrate 410 and a second transparent substrate 420 which are placed so that electrode patterns 440 and 450 formed on the surfaces thereof are opposed to each other.

In order to construct such a liquid crystal device 400, after red (R), green (G), and blue (B) color filters 407R, 407G, and 407B are formed on the second transparent substrate 420, a planarizing film 427, the second electrode patterns 450, an insulating overcoating film 429, and an alignment film 416 made of polyimide resin are formed in that order on the front sides of the color filters 407R, 407G, and 407B. The first electrode patterns 440 and an alignment film 412 made of polyimide resin are formed in that order on the first transparent substrate 410.

In the first transparent substrate 410 and the second transparent substrate 420, as shown in FIG. 2, a first terminal region 411 and a second terminal region 421 are formed along substrate edges 418 and 428. Conductive connection between the substrates and connection with a flexible substrate 70 are performed in these terminal regions. Therefore, the alignment films 412 and 416 and the overcoating film 429 are not formed in the first terminal region 411 and the second terminal region 421 on the first transparent substrate 410 and the second transparent substrate 420.

For this reason, the sides of the surfaces of the first transparent substrate 410 and the second transparent substrate 420 in the lengthwise direction (the direction shown by arrow L in FIG. 2), on which the first terminal region 411 and the second terminal region 421 are formed, serve as uncoated areas 12 which need not be coated with films, such as the alignment films 412 and 416 and the overcoating film 429. The sides on which a liquid-crystal-sealed region 435 is formed serve as coated areas 11 which need to be coated with films, such as the alignment films 412 and 416 and the overcoating film 429. Therefore, it is necessary to selectively form the alignment films 412 and 416 and the overcoating film 429 on the surfaces of the first transparent substrate 410 and the second transparent substrate 420.

Figure 5:
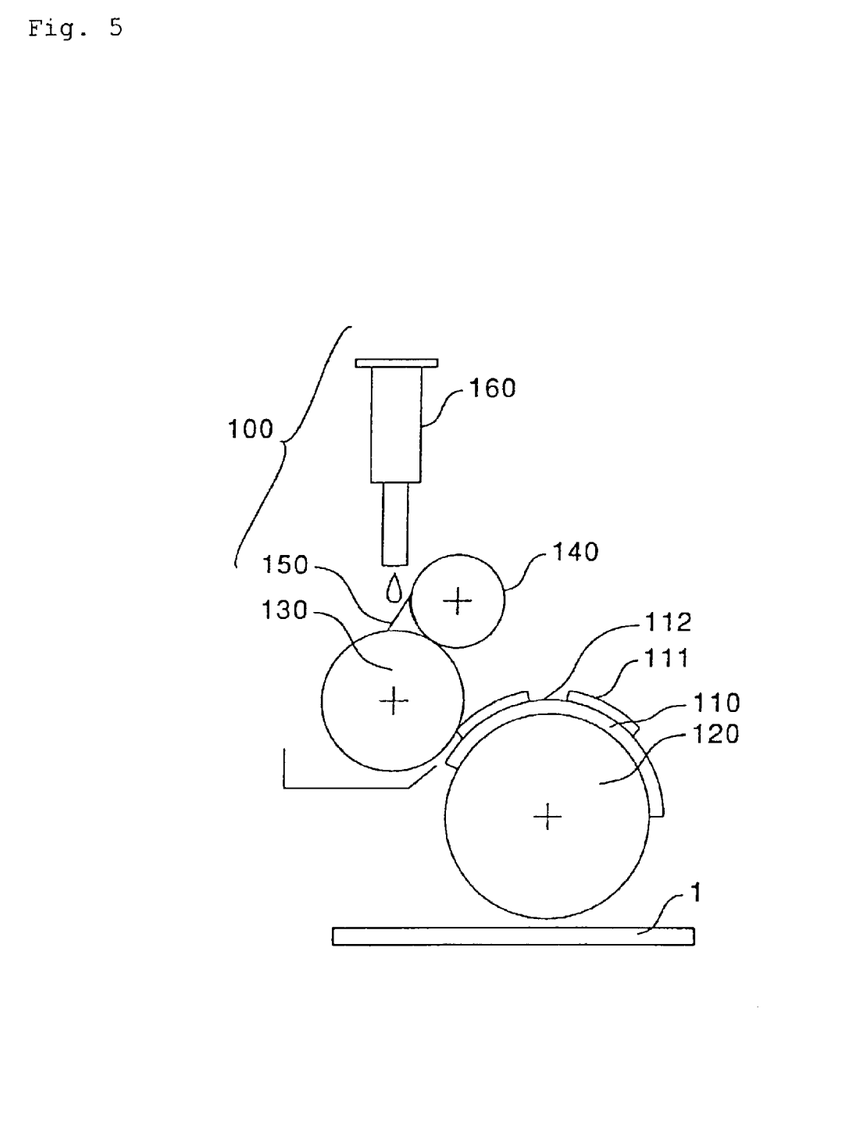
FIG. 5 is an explanatory view of a coating device used in the flexographic process.

Accordingly, the alignment films 412 and 416, the overcoating film 429, and are formed by flexography. In a coating device 100 used in flexography, as shown in FIG. 5, coating liquid is transferred from an anilox roller 130 onto a letterpress 110 which is mounted around a drum 120, and the coating liquid transferred onto projections 111 formed on the surface of the letterpress 110 is transferred onto a substrate.

As shown in FIGS. 6(A) and 6(B), meshes 139 are formed at a pitch P2 on the surface of the anilox roller 130 in order to enhance the coating liquid holding ability. As shown in FIGS. 7(A) and 7(B), meshes 119 are also formed at a pitch P3 on the surfaces of the projections 111 of the letterpress 110 in order to enhance the coating liquid holding ability.

Problems to be Solved by the Invention

Since the color filters 407R, 407G, and 407B are formed in a predetermined repetitive pattern on the surface of the second transparent substrate 420 which is subjected to such flexography, as shown in FIG. 3(B), color filters of the same color, of the color filters 407R, 407G, and 407B, are formed at a predetermined pitch P1 (same-color pitch).

Figure 6:
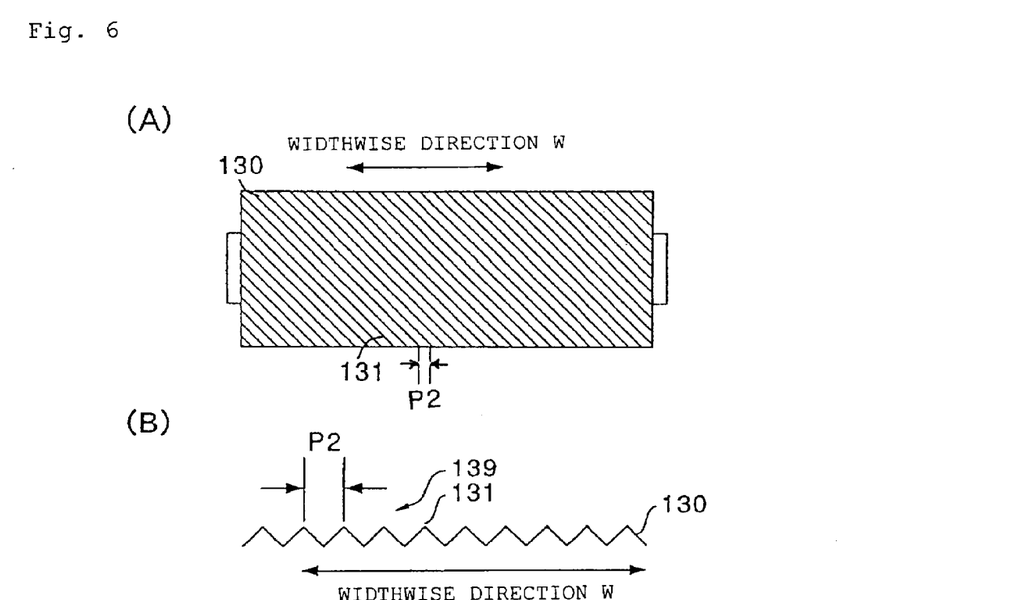
FIGS. 6(A) and 6(B) are an explanatory view and a sectional view, respectively, of meshes formed on an anilox roller shown in FIG. 5.
Figure 7:
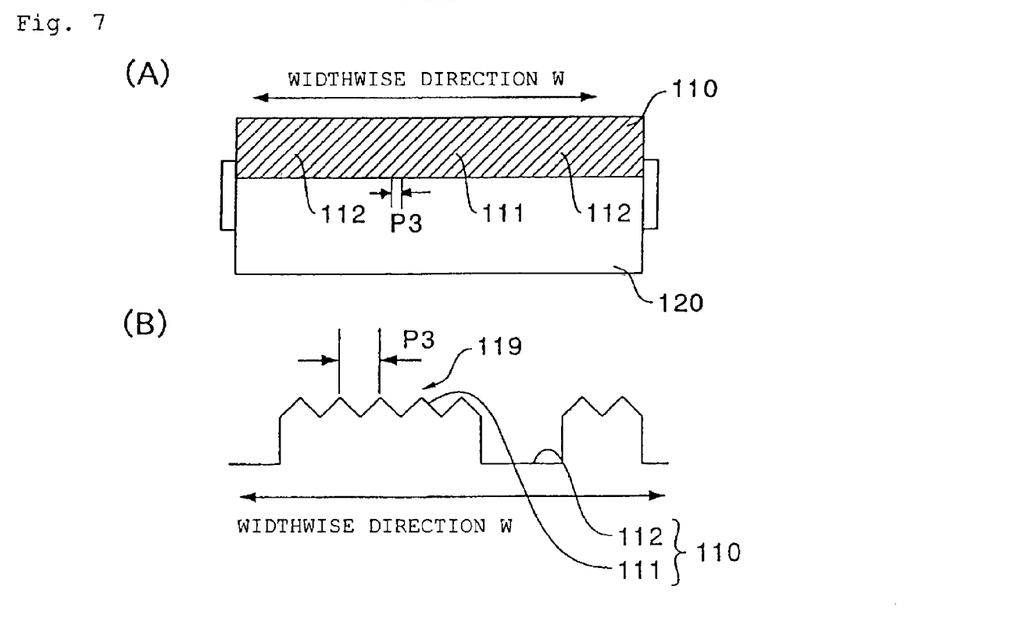
FIGS. 7(A) and 7(B) are an explanatory view and a sectional view, respectively, of meshes formed on a letterpress shown in FIG. 5.

In the coating device 100 which has been described with reference to FIGS. 5, 6, and 7, when a film for forming the alignment film 416 is transferred from the letterpress 110 onto the second transparent substrate 420, marks of the meshes 139 of the anilox roller 130 and marks of the meshes 119 formed on the surfaces of the projections 111 of the letterpress 110 are made on the surface of the transferred film.

Therefore, in the second transparent substrate 420, the marks of the meshes 139 of the anilox roller 130 and the marks of the meshes 119 formed on the surfaces of the projections 111 of the letterpress 110 are transferred onto the alignment film 416, and the color filters of the same color, of the color filters 407R, 407G, and 407B, are formed at a predetermined same-color pitch P1 on a layer disposed thereunder. Moreover, the pitch P2 of the meshes 139 of the anilox roller 130, the pitch P3 of the meshes 119 formed on the surfaces of the projections 111 of the letterpress 110, and the pitch P1 of the color filters of the same color, of the color filters 407R, 407G, and 407B, are substantially equal, but are slightly different from one another.

For this reason, in the second transparent substrate 420, the color filters 407R, 407G, and 407B with the same-color pitch P1, the marks of the meshes 139 of the anilox roller 130, and the marks of the meshes 119 on the projections 111 of the letter press 110 interfere with one another and cause moire. This decreases the quality of images formed by the liquid crystal device 410.

In view of the above problems, it is a feature of the present invention to provide a method for manufacturing an electro-optical device in which moiré can be prevented even when films are formed on the front sides of color filters by flexography.

SUMMARY OF THE INVENTION

In order to overcome the above problems, the present invention provides a method for manufacturing an electro-optical device including a flexographic process of forming a film by flexography on the front side of a substrate on which color filters of a plurality of colors are formed at a predetermined same-color pitch, wherein at least two of the pitch of meshes formed on the surface of an anilox roller used in the flexographic process, the pitch of meshes formed on the surface of a projection of a letterpress for transferring coating liquid, transferred from the anilox roller, onto the substrate, and the pitch of color filters of the same color, of the color filters, are set to be equal.

In the present invention, a film, such as an alignment film or an overcoating film, is formed by flexography on the front side of the substrate on which the color filters are formed at a predetermined same-color pitch, and the marks of the meshes formed at a predetermined pitch on the anilox roller, and the marks of the meshes formed at a predetermined pitch on the surface of the projection of the letterpress are transferred on the surface of the film. Since at least two of the three pitches are equal, the cause of the moiré can be removed. Since moiré will not occur, it is possible to produce an electro-optical device with high image quality.

In the present invention, the pitch of the meshes of the anilox roller, the pitch of the meshes formed on the surface of the projection of the letterpress, and the pitch of the color filters of the same color may substantially be equal.

In the present invention, the film is an alignment film for controlling the alignment state of an electro-optical substance when the substrate is used in the electro-optical device.

In the present invention, it is preferable to form the above film on a dummy substrate by flexography before the film is formed by flexography on the front side of the substrate used in the electro-optical device. This makes it possible to stabilize the conditions on which the substrate to be used in the electro-optical device is subjected to flexography.

DETAILED DESCRIPTION OF THE PREFERRED EMBODIMENTS

An embodiment of the present invention will be described with reference to the attached drawings.
(Configuration of Liquid Crystal Device)

Figure 1:
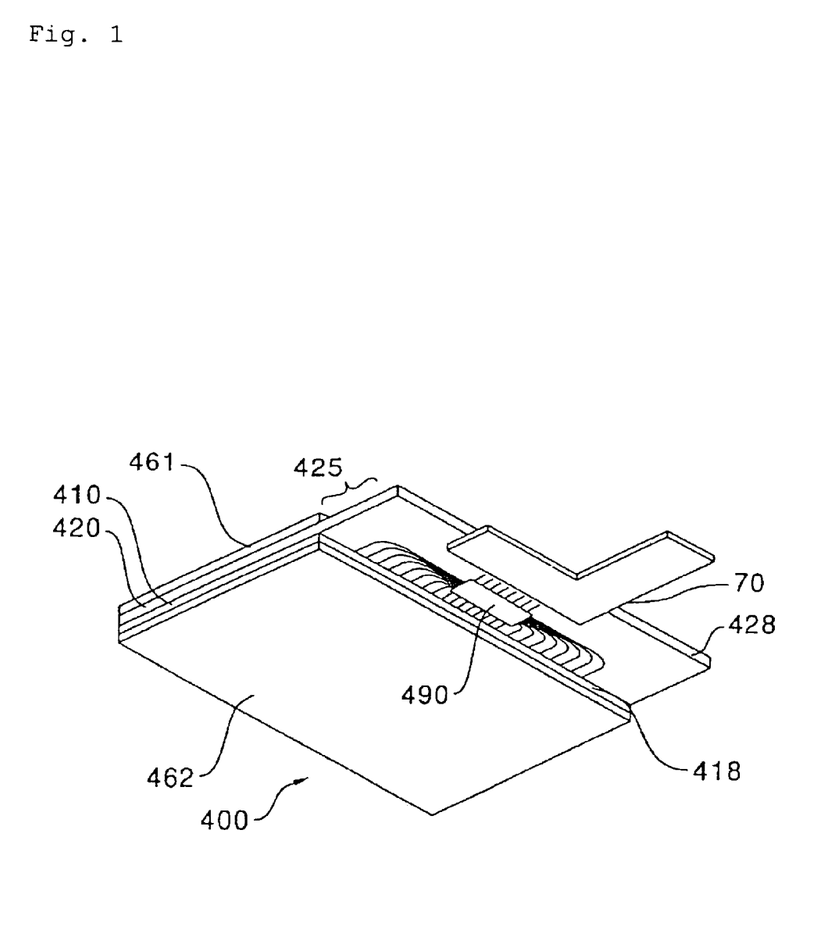
FIG. 1 is a perspective bottom view of a liquid crystal device to be used in a mobile telephone.

FIGS. 1 and 2 are a perspective view and an exploded perspective view, respectively, of a liquid crystal device serving as an electro-optical device used in an electronic device, such as a mobile telephone, as viewed from diagonally below. FIG. 3(A) is a sectional view of the liquid crystal device, and FIG. 3(B) is an explanatory view showing the arrangement of color filters formed in the liquid crystal device.

An electro-optical device shown in FIGS. 1, 2, and 3(A) is a passive matrix color liquid crystal device 400. A liquid-crystal-sealed region 435 is defined by a sealing material 430 between a pair of transparent substrates formed of rectangular glasses that are bonded by the sealing material 430 with a predetermined space therebetween. Liquid crystal 404 is sealed in the liquid-crystal-sealed region 435. Herein, one of the pair of transparent substrates, on which a plurality of first electrode patterns 440 are formed so as to extend in the longitudinal direction inside the liquid-crystal-sealed region 435, is designated a first transparent substrate 410, and the other substrate, on which a plurality of second electrode patterns 450 are formed so as to extend in the widthwise direction inside the liquid-crystal-sealed region 435, is designated a second transparent substrate 420.

In the second transparent substrate 420, red (R), green (G), and blue (B) color filters 407R, 407G, and 407B are formed in areas corresponding to the intersections of the first electrode patterns 440 and the second electrode patterns 450, as shown in FIG. 3(A).

Such color filters 407R, 407G, and 407B are formed on the surface of the second transparent substrate 420 in a predetermined repetitive pattern. In the color filters 407R, 407G, and 407B illustrated in FIG. 3(B), the color filters of the same color are formed in stripes at a pitch P1 (same-color pitch) in the widthwise direction W of the second transparent substrate 420.

In the second transparent substrate 420, an insulating planarizing film 427 made of acrylic resin, the second electrode patterns 450, and an alignment film 416 having a thickness of 10 nm to 50 nm and made of polyimide resin are formed in that order on the front side of the color filters 407R, 407G, and 407B. In contrast, in the first transparent substrate 410, the first electrode patterns 440 and an alignment film 412 having a thickness of 10 nm to 50 nm and made of polyimide resin are formed in that order. On the electrode patterns of at least one of the first transparent substrate 410 and the second transparent substrate 420, an insulating thin overcoating film is formed to prevent a short circuit between the substrates. In the example shown in FIG. 3(A), an insulating overcoating film 429 is formed on the second electrode patterns 450 of the second transparent substrate 420.

In the liquid crystal device 400, the second electrode patterns 450 are formed of ITO (Indium Tin Oxide/ transparent conductive) films. While the first electrode patterns 440 may be formed of ITO films, they are formed of thin aluminum films in this embodiment. For this reason, a part of light, which reaches the first electrode patterns 440 formed of thin aluminum films, passes therethrough, and the other part is reflected thereby. Accordingly, the liquid crystal device 400 serves as a semi-transmissive and semi-reflective liquid crystal device having the function as a transmissive liquid crystal device and the function as a reflective liquid crystal device. A polarizer 461 is bonded onto the outer surface of the second transparent substrate 420, and a polarizer 462 is bonded onto the outer surface of the first transparent substrate 410.

When such a semi-transmissive and semi-reflective liquid crystal device 400 is constructed, the first electrode patterns 440 may be formed of aluminum films having such a thickness that completely reflects light, and small light-transmitting holes may be formed at the portions of the first electrode patterns 440 which intersect the second electrode patterns 450.

Referring again to FIGS. 1 and 2, a first terminal region 411 and a second terminal region 421, which are respectively formed in the first transparent substrate 410 and the second transparent substrate 420 adjacent to substrate edges 418 and 428 thereof extending in the same direction, are used to input and output signals to and from the outside and to conductively connect the substrates. As the second transparent substrate 420, a substrate larger than the first transparent substrate 410 is used. When the first transparent substrate 410 and the second transparent substrate 420 are bonded together, a driving IC 490 is COG-mounted on a portion 425 of the second transparent substrate 420 which projects from the substrate edge 418 of the first transparent substrate 410. Input/output terminals 481 are formed in a portion of the second terminal region 421 of the second transparent substrate 420 closer to the substrate edge 428 than the driving IC 490, and a flexible substrate 70 is connected to the input/output terminals 481.

Since a portion of the second terminal region 421 closer to the liquid-crystal-sealed region 435 than the driving IC 490 is used for conductive connection with respect to the first transparent substrate 410, it is formed so as to overlap the first transparent substrate 410. Since the first terminal region 411 of the first transparent substrate 410 is used for conductive connection with respect to the second transparent substrate 420, it is formed so as to overlap the second transparent substrate 420.

Accordingly, by bonding the first transparent substrate 410 and the second transparent substrate 420 with the sealing material 430 containing a substrate-connecting material so as to conductively connect the substrate-connecting terminals between the substrates, and inputting signals from the input/output terminals 481 of the second transparent substrate 420 to the driving IC 490, signals output from the driving IC 490 are supplied to the first electrode patterns 440 and the second electrode patterns 450. Consequently, pixels corresponding to the intersections of the first electrode patterns 440 and the second electrode patterns 450 can be driven individually.

The alignment films 412 and 416 and the overcoating film 429 are not formed on the first terminal region 411 and the second terminal region 421 formed on the surfaces of the first transparent substrate 410 and the second transparent substrate 420.

(Method for Manufacturing Liquid Crystal Device 400)

Figure 4:
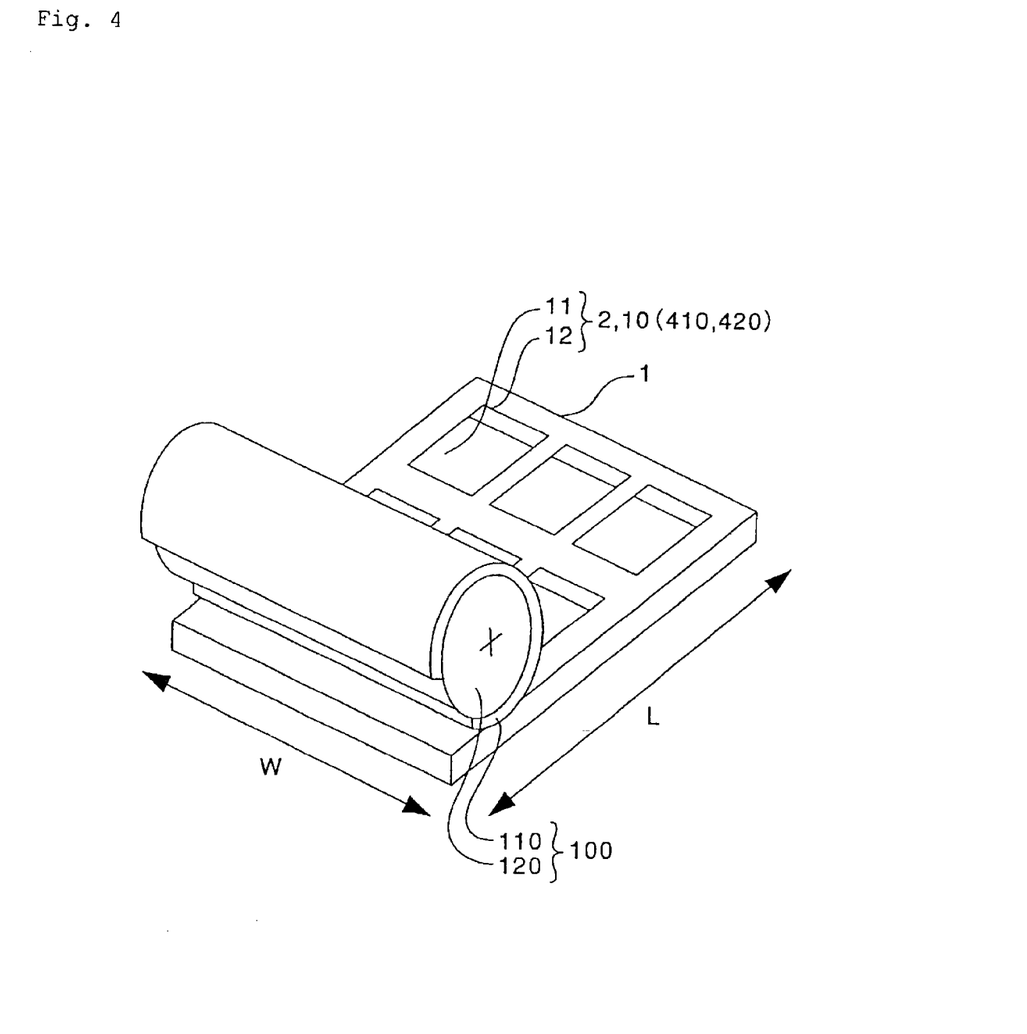
FIG. 4 is an explanatory view showing a flexographic process.

FIG. 4 is an explanatory view showing a flexographic process, and FIG. 5 is an explanatory view of a coating device used in the flexographic process. FIGS. 6(A) and 6(B) are an explanatory view and a sectional view, respectively, of meshes formed on an anilox roller shown in FIG. 5. FIGS. 7(A) and 7(B) are an explanatory view and a sectional view, respectively, of meshes formed on a letterpress shown in FIG. 5.

In order to produce the liquid crystal device 400 shown in FIGS. 3(A) and 3(B), after the red (R), green (G), and blue (B) color filters 407R, 407G, and 407B are printed on the second transparent substrate 420, the planarizing film 427 made of acrylic resin, the second electrode patterns 450, the overcoating film 429, and the alignment film 416 made of polyimide resin are formed in that order on the front sides of the color filters 407R, 407G, and 407B. The first electrode patterns 440 formed of ITO films and the alignment film 412 made of polyimide resin are formed in that order on the first transparent substrate 410.

In the liquid crystal device 400, the first terminal region 411 and the second terminal region 421 are formed along the substrate edges 418 and 428 of the first transparent substrate 410 and the second transparent substrate 420, as shown in FIG. 2, and the conductive connection between the substrates and the connection with the flexible substrate 70 are established in these terminal regions. Therefore, it is obstructive to form the alignment films 412 and 416 and the overcoating film 429 on the first terminal region 411 and the second terminal region 421 on the surfaces of the first transparent substrate 410 and the second transparent substrate 420.

For this reason, areas of the first transparent substrate 410 and the second transparent substrate 420, on which the first terminal region 411 and the second terminal region 421 are formed in the lengthwise direction (the direction shown by arrow L in FIG. 2), serve as uncoated areas 12 which need not be coated with the alignment films 412 and 416 and the overcoating film 429, and areas on which the liquid-crystal-sealed region 435 is formed serve as coated areas 11 which need to be coated with the alignment films 412 and 416 and the overcoating film 429. Accordingly, it is necessary to selectively form the alignment films 412 and 416 and the overcoating film 429 on the surfaces of the first transparent substrate 410 and the second transparent substrate 420.

The first transparent substrate 410 and the second transparent substrate 420 are subjected to the processes reaching the flexographic process in the state of a large substrate 1 from which the substrates can be cut as a plurality of discrete substrates 10, as shown in FIG. 4. In this embodiment, after the above processes are performed, the large substrate 1 is subjected to a rubbing process, discrete-substrate regions 2 are cut from the large substrate 1, and discrete substrates 10 are obtained as the first transparent substrate 410 and the second transparent substrate 420. Therefore, a plurality of discrete-substrate regions 2 are arranged in the lengthwise direction L and the widthwise direction W on the surface of the large substrate 1 in a state in which they are surrounded by cutoff regions 3. Each of the discrete-substrate regions 2 includes a coated area 11 that needs to be coated with films, such as the alignment films 412 and 416 and the overcoating film 429, and an uncoated area 12 which needs not be coated with these films.

For this reason, in this embodiment, the large substrate 1 is subjected to flexography using a coating device 100 in which a letterpress 110 is mounted around a drum 120. By subjecting films formed by flexography to baking or other processes, the alignment films 412 and 416, the overcoating film 429 are formed.

In such a coating device 100 used for flexography, as shown in FIG. 5, the space between an anilox roller 130 and a doctor roller 140 is filled with coating liquid 150 for forming the alignment films 412 and 416 and the overcoating film 429, and the anilox roller 130 and the doctor roller 140 are rotated at a fixed speed. In this case, a layer of the coating liquid 150 having a uniform thickness is formed between the anilox roller 130 and the doctor roller 140. On the other hand, the letterpress 110 formed corresponding to the length of the large substrate 1 is mounted around the drum 5. By bringing the drum 120 into contact with the anilox roller 130, the coating liquid 150 is transferred in a uniform thickness onto the surface of the letterpress 110. The letterpress 110 is provided with projections 111 for transferring the coating liquid 150 onto the large substrate 1, and recesses 112 which do not transfer the coating liquid 150. The projections 111 and the recesses 112 are formed in a predetermined pattern. Therefore, when the large substrate 1 moves with respect to the rotating drum 120 while being in contact with the letterpress 110, the coating liquid 150 is selectively transferred onto the portions of the surface of the large substrate 1 on which the projections 111 of the letterpress 110 abut.

As shown in FIGS. 6(A) and 6(B), linear meshes 139 are diagonally formed on a surface 131 of the anilox roller 130 in order to enhance the coating liquid holding ability. The pitch of the meshes 139 in the widthwise direction W is designated P2. As shown in FIGS. 7(A) and 7(B), linear meshes 119 are also diagonally formed on the surfaces of the projections 111 of the letterpress 110 in order to enhance the coating liquid holding ability. The pitch of the meshes 119 in the widthwise direction W is designated P3.

For this reason, marks of the meshes 139 of the anilox roller 130 are made on the surface of the coating liquid 150 which is transferred from the anilox roller 130 onto the surface of the letterpress 110. Such coating liquid 150 with the marks of the meshes 139 thereon is transferred from the projections 111 of the letterpress 110 onto the large substrate 1. Therefore, when the alignment films 412 and 416 and the overcoating film 429 are formed by baking the coating liquid transferred onto the large substrate 1, the marks of the meshes 139 of the anilox roller 130 and the marks of the meshes 119 formed on the surfaces of the projections 111 of the letterpress 110 are transferred onto the surfaces of the alignment films 412 and 416 and the overcoating film 429.

After the alignment films 412 and 416 and the overcoating film 429 are formed on the large substrate 1, the surface of the large substrate 1 is subjected to rubbing, and discrete-substrate regions 2 are cut from the large substrate 1, so that the first transparent substrates 410 and the second transparent substrates 420 can be obtained as discrete substrates 10. In such a cutting process, the portions of the large substrate 1 corresponding to the cutoff regions 3 are disposed of.

(Features of Flexographic Process)

In this embodiment, when the overcoating film 429 and the alignment film 416 are formed on the surface of the second transparent substrate 420 in this way, the same-color pitch P1 in the widthwise direction of the color filters 407R, 407G, and 407B, the pitch P2 in the widthwise direction of the meshes 139 of the anilox rollers 130, and the pitch P3 in the widthwise direction of the meshes 119 formed on the surfaces of the projections 111 of the letterpress 110 are set to be equal.

For this reason, in a state in which the overcoating film 429 and the alignment film 416 are formed on the front side of the color filters 407R, 407G, and 407B, the color filters 407R, 407G and 407B with the same-color pitch P1 in the widthwise direction are formed on the front side of the second transparent substrate 420, and the marks of the meshes 139 of the anilox roller 130 with the pitch P2 in the widthwise direction and the marks of the meshes 119 formed on the surfaces of the projections 111 of the letterpress 110 with the pitch P3 in the widthwise direction are transferred on the overcoating film 429 and the alignment film 416 formed on the front side thereof. In this embodiment, since the same-color pitch P1 in the widthwise direction of the color filters 407R, 407G and 407B, the pitch P2 in the widthwise direction of the meshes 139 of the anilox roller 130, and the pitch P3 in the widthwise direction of the meshes 119 formed on the surfaces of the projections 111 of the letterpress 110 are equal, the same pattern s of the color filters 407R, 407G, and 407B, the marks of the meshes 139 of the anilox roller 130, and the marks of the meshes 119 on the projections 111 of the letterpress 110 do not interfere with one another. As a result, it is possible to produce the liquid crystal device 400 with high image quality.

Before the films for the alignment film 416 and the overcoating film 429 are formed on the front side of the second transparent substrate 420 to be used in the liquid crystal device 400 by flexography, it is preferable to form the above films on a dummy substrate by flexography, and to thereby stabilize the conditions, on which the second transparent substrate 420 to be actually incorporated in the liquid crystal device 400 is subjected to flexography, beforehand.

While the same-color pitch P1 in the widthwise direction of the color filters 407R, 407G, and 407B, the pitch P2 in the widthwise direction of the meshes 139 of the anilox rollers 130, and the pitch P3 in the widthwise direction of the meshes 119 formed on the surfaces of the projections 111 of the letterpress 110 are equal in the above embodiment, it is possible to remove the cause of the moiré as long as any two of the pitches P1, P2, and P3 are equal. Therefore, the same-color pitch P1 in the widthwise direction of the color filters 407R, 407G, and 407B and the pitch P2 in the widthwise direction of the meshes 139 of the anilox roller 130 may be equal, the pitch P2 in the widthwise direction of the meshes 139 of the anilox roller 130 and the pitch P3 in the widthwise direction of the meshes 119 formed on the surfaces of the projections 111 of the letterpress 110 may be equal, or the pitch P3 in the widthwise direction of the meshes 119 formed on the surfaces of the projections 111 of the letterpress 110 and the same-color pitch P1 in the widthwise direction of the color filters 407R, 407G, and 407B may be equal.

While the arrangement of the color filters 407R, 407G, and 407B, the arrangement and shape of the meshes 139 of the anilox roller 130, and the arrangement and shape of the meshes 119 of the letterpress 110 may be variously changeable, it is possible to remove the cause of the moiré and to prevent the occurrence of the moiré as long as two of the same-color pitch P1 in the direction in which the color filters of the same color, of the color filters 407R, 407G, and 407B, appear repeatedly, the pitch P2 of the meshes 139 of the anilox roller 130, and the pitch P3 of the meshes 119 formed on the surfaces of the projections 111 of the letterpress 110 are equal.

While the passive matrix liquid crystal device has been described in the above embodiment, since an alignment film and an overcoating film are also formed by flexography on the front side of a substrate having color filters in an active matrix liquid crystal device, the present invention may be applied to the production of an active matrix liquid crystal device or other electro-optical devices.

As described above, in the present invention, the films, such as the alignment film and the overcoating film, are formed by flexography on the front side of the substrate on which color filters are formed at a predetermined same-color pitch. Although the marks of the meshes formed at a predetermined pitch on the anilox roller and the marks of the meshes formed at a predetermined pitch on the surfaces of the projections of the letterpress are transferred onto the surfaces of the films, since at least two of the pitches are equal, the cause of the moiré can be removed. Since moiré will not occur, it is possible to produce an electro-optical device with high image quality.

What is claimed is:

1. A method for manufacturing an electro-optical device including a flexographic process, comprising:
    forming color filters that include a plurality of colors at a first predetermined pitch on a front side of a substrate;
    transferring a coating liquid from an anilox roller onto a projection, said projection formed on a letterpress; and
    transferring said coating liquid from said projection to said substrate, said coating liquid thereby forming a film on said substrate;
    wherein at least two of:
        said first predetermined pitch of said color filters of the same color;
        a second pitch of meshes, which enhance a holding ability of said coating liquid, formed on a surface of said anilox roller; and
        a third pitch of meshes, which enhance a holding ability of said coating liquid, formed on a surface of said projection are substantially equal.

2. A method for manufacturing an electro-optical device according to claim 1, wherein said predetermined pitch of said color filters, said second pitch of meshes formed on said surface of said anilox roller, and said third pitch of meshes formed on said surface of said projection are substantially equal.

3. A method for manufacturing an electro-optical device according to claim 1, wherein said film is an alignment film for controlling an alignment state of an electro-optical substance.

4. A method for manufacturing an electro-optical device according to claim 1, wherein said film is formed on a dummy substrate by flexography before said film is formed by flexography on said front side of said substrate.

5. A method for manufacturing a liquid crystal device comprising:

(a) providing a transparent substrate capable of being divided into a plurality of smaller discrete substrates;

(b) forming color filters at a first predetermined pitch on discrete regions of said substrate;

(c) forming a planarizing film on said color filters;

(d) forming an electrode pattern on said planarizing film;

(e) forming an overcoating film on said electrode pattern;

(f) forming an alignment film on said overcoating film;

(g) forming a first terminal region and a second terminal region along edges of said discrete regions of said substrate, said edges not containing said overcoating film and said alignment film; and (h) dividing said substrate into a plurality of discrete substrates containing said color filters, wherein steps (e) and (f) include:

transferring a coating liquid from an anilox roller onto a projection formed on a letterpress; and transferring said coating liquid from said projection to said substrate thereby forming said overcoating film and said alignment film respectively, and at least two of:

said first predetermined pitch of said color filters of the same color;

a second pitch of meshes, which enhance a holding ability of said coating liquid, formed on a surface of said anilox roller; and a third pitch of meshes, which enhance a holding ability of said coating liquid, formed on a surface of said projection are substantially equal.

6. A method for manufacturing a liquid crystal device according to claim 5, wherein said predetermined pitch of said color filters, said second pitch of meshes formed on said surface of said anilox roller, and said third pitch of meshes formed on said surface of said projection are substantially equal.

* * * * *